United States Patent
Schoen et al.

(10) Patent No.: US 9,850,003 B2
(45) Date of Patent: Dec. 26, 2017

(54) EXTERIOR AIRCRAFT NAVIGATION LIGHT AND METHOD OF CONTROLLING AN EXTERIOR AIRCRAFT NAVIGATION LIGHT

(71) Applicant: Goodrich Lighting Systems GmbH, Lippstadt (DE)

(72) Inventors: Christian Schoen, Mainz (DE); Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/080,739

(22) Filed: Mar. 25, 2016

(65) Prior Publication Data
US 2016/0280396 A1 Sep. 29, 2016

(30) Foreign Application Priority Data
Mar. 27, 2015 (EP) .................................... 15161388

(51) Int. Cl.
*B64D 47/06* (2006.01)

(52) U.S. Cl.
CPC .......... *B64D 47/06* (2013.01); *B64D 2203/00* (2013.01)

(58) Field of Classification Search
CPC .... H05B 37/02; H05B 37/0227; H05B 33/08; H05B 33/0854; B64D 47/04; B64D 47/06; G01S 17/02; G01S 17/42
See application file for complete search history.

(56) References Cited

U.S. PATENT DOCUMENTS

| | | | | |
|---|---|---|---|---|
| 6,507,290 B1* | 1/2003 | Lodhie | .................. | B64D 47/06 244/1 R |
| 8,662,721 B2* | 3/2014 | Calvin | .................. | B64D 47/06 362/331 |
| 2009/0303081 A1* | 12/2009 | Annati | .................. | B64D 47/06 340/945 |
| 2013/0094210 A1* | 4/2013 | Rice | ..................... | F21S 48/1154 362/245 |

FOREIGN PATENT DOCUMENTS

EP 2130766 A2 12/2009

OTHER PUBLICATIONS

Extended European Search Report; Application No. 15161388.2-1757; dated Sep. 9, 2015; 6 pages.

\* cited by examiner

*Primary Examiner* — Thai Pham
(74) *Attorney, Agent, or Firm* — Cantor Colburn LLP

(57) ABSTRACT

An exterior aircraft navigation light for an aircraft having a nominal forward flight direction and being able to fly into the nominal forward flight direction as well as into a plurality of further flight directions, such as sideways or backwards, has at least one light emission unit and control circuitry coupled to the at least one light emission unit, wherein the exterior aircraft navigation light is configured such that each of the at least one light emission unit has a unit-specific light emission direction that has a predefined horizontal angle with respect to the nominal forward flight direction, and wherein each of the at least one light emission unit includes a multi-color light source configured to emit red light, white light and green light, and an optical system for conditioning the red light, the white light and the green light emitted by the multi-color light source.

13 Claims, 5 Drawing Sheets

EXTERIOR AIRCRAFT NAVIGATION LIGHT AND METHOD OF CONTROLLING AN EXTERIOR AIRCRAFT NAVIGATION LIGHT

FOREIGN PRIORITY

This application claims priority to European Patent Application No. 15 161 388.2 filed Mar. 27, 2015, the entire contents of which is incorporated herein by reference.

TECHNICAL FIELD

The present invention relates to exterior aircraft lighting. In particular, it relates to exterior aircraft navigation lights that indicate an aircraft's travel direction to the environment.

BACKGROUND OF THE INVENTION

Almost all aircraft have exterior lighting. Exterior lighting serves a plurality of purposes. While some exterior aircraft lights provide active visibility, i.e. they allow for the pilots and the crew to examine the aircraft environment, other exterior aircraft lights provide for passive visibility, i.e. they make the aircraft visible to others, particularly in the dark.

A particular kind of exterior aircraft lights are so-called navigation lights, sometimes also referred to as position lights. In accordance with regulatory requirements and/or industry standards, such as the Federal Aviation Regulations (FAR), aircraft are equipped with a plurality of such navigation lights, with each of the navigation lights, depending on the position on the aircraft, emitting one of red light, white light, and green light. In this way, observers of the aircraft can deduce a direction of travel from the color of the navigation light that is visible from the viewing direction of the observer. However, for aircraft that are capable of flying not only forward, but in a plurality of different directions, such as for example helicopters, the light emitted by the navigation lights may convey misleading information to the observer.

Accordingly, it would be beneficial to provide an exterior aircraft navigation light that has improved capabilities of conveying navigation information.

SUMMARY

Exemplary embodiment of the invention include an exterior aircraft navigation light for an aircraft having a nominal forward flight direction and being able to fly into the nominal forward flight direction as well as into a plurality of further flight directions, such as sideways or backwards, wherein the exterior aircraft navigation light has at least one light emission unit and control circuitry coupled to the at least one light emission unit, wherein the exterior aircraft navigation light is configured such that each of the at least one light emission unit has a unit-specific light emission direction that has a predefined horizontal angle with respect to the nominal forward flight direction, wherein each of the at least one light emission unit comprises a multi-color light source configured to emit red light, white light and green light, and an optical system for conditioning the red light, the white light and the green light emitted by the multi-color light source, wherein the control circuitry is configured, as a response to a momentary flight direction of the aircraft and the unit-specific light emission direction, to control the multi-color light source such that the respective light emission unit emits one of the red light, the white light and the green light.

By providing a multi-color light source that is able to emit red, white or green light and that is configured to emit light of all three colors in the unit-specific light emission direction and by providing means for controlling the multi-color light source to select the color to be emitted, it is made possible that the light emission unit in question emits red light or white light or green light at different points in time. In other words, for a particular unit-specific light emission direction that has a predefined horizontal angle with respect to the nominal forward flight direction of the aircraft, it can be individually selected at any point in time whether the light emission unit in question emits red light or white light or green light. By making the selection with respect to red light, white light and green light dependent on the momentary flight direction of the aircraft, it can be ensured that the light emission of the exterior air craft navigation light always conveys information that enables the observer of the aircraft to deduce the momentary flight direction of the aircraft correctly. In other words, by equipping an aircraft with above described exterior aircraft navigation lights, the aircraft is able to convey its flight direction correctly by the exterior aircraft navigation light(s), irrespective of whether the aircraft is flying in a nominal forward flight direction or in another possible flight direction. This in turn increases passive safety of the aircraft to which the exterior aircraft navigation light is installed.

The exterior aircraft navigation light, as discussed above, is of particularly beneficial use in aircraft that can move into various directions. While air planes generally move in a substantially forward direction, i.e. in a direction that substantially corresponds to the orientation of the air plane fuselage, other type of aircraft, such as helicopters, can move in a nominal forward flight direction as well as in other directions, such as backwards or sideways. In a particular example, a common helicopter with a main rotor and an anti-torque tail rotor can move forwards, backwards, sideways, and in all directions there between. The exterior aircraft navigation light, as described herein, allows for a signalling of the momentary flight direction of such an aircraft, without conveying misleading information.

As stated above, the exterior aircraft navigation light is configured such that each of the at least one light emission unit has a unit-specific light emission direction that has a predefined horizontal angle with respect to the nominal forward flight direction. In particular, the exterior aircraft navigation light may be configured such that the exterior aircraft navigation light has mechanical fixing means and/or such that the light emission unit has an optical system for directing the light output in such a way that the emitted light is in the unit-specific emission direction.

On the basis of this unit-specific light emission direction, the control circuitry is configured to take into account the momentary flight direction of the aircraft and to select one of the red light, the white light, and the green light for being output by the light emission unit in question. In other words, by each of the at least one light emission unit having a particular unit-specific light emission direction and by relating this unit-specific light emission direction to the momentary flight direction of the aircraft, a correct output of navigation information via the respective color can be ensured.

It is pointed out that the term unit-specific light emission direction does not refer to an exact angle with respect to the nominal forward flight direction, with all light being output in a collimated manner at this exact angle. Rather, the term unit-specific light emission direction refers to an angular range of light output in a horizontal plane, with the center of this angular range having the predefined horizontal angle with respect to the nominal forward flight direction. As said angular range is generally very small as compared to a 360° illumination of the horizontal plane, it is appropriate to talk about a unit-specific light emission direction.

The term navigation light refers to a unit that steadily outputs light of a particular color for signalling the position and moving direction of the aircraft. The term position light is also used in the art for those navigation lights.

According to a further embodiment, the control circuitry has a control unit comprising a signal input for receiving a flight direction signal indicative of the momentary flight direction, wherein the control unit is configured, as a response to the flight direction signal and the unit-specific light emission direction, to select said one of the red light, the white light and the green light and to control the multi-color light source accordingly for each of the at least one light emission unit. In particular, the control unit may comprise a memory for storing the unit-specific light emission direction for each of the at least one light emission unit. In this way, the control unit may conveniently select which one of the red light, the white light and the green light is to be output on the basis of the received flight direction signal. In such a configuration, the control unit may only require one momentary input, namely the flight direction signal, in order to control the exterior aircraft navigation light in an appropriate manner at any point in time.

It is pointed out that it is alternatively possible that the control circuitry of the exterior aircraft navigation light receives a plurality of external control signals, indicating for each of the at least one light emission unit which of red light, the white light and the green light is to be output, and that the control circuitry drives the multi-color light source accordingly for each of the at least one light emission unit. In this way, the control circuitry controls the at least one light emission unit on the basis of appropriate external control signals. In such a configuration, it is possible that a control unit, external to the exterior aircraft navigation light, makes the decision with respect to the color selection and that this external control unit is provided for controlling a plurality of exterior aircraft navigation lights. While such a configuration may lead to a lower number of control units, the wiring and/or communication efforts throughout the aircraft are higher.

According to a further embodiment, the signal input of the control unit is connectable to an external signal line for receiving the flight direction signal from an on-board aircraft navigation system that is external to the exterior aircraft navigation light. In this way, the control unit of the exterior aircraft navigation light is able to communicate with the on-board aircraft navigation system, which has the information about the momentary flight direction readily available. In this way, no additional hardware for determining the momentary flight direction is necessary.

Alternatively/additionally, the exterior aircraft navigation light may further comprise a flight direction sensor configured to detect the momentary flight direction and to output the flight direction signal indicative of the momentary flight direction, wherein the control unit is coupled to the flight direction sensor via the signal input for receiving the flight direction signal. By providing a flight direction sensor within the exterior aircraft navigation light, the exterior aircraft navigation light is autonomous in terms of selecting the appropriate light color and does not have to rely on external information.

According to a further embodiment, the control unit is configured to determine a momentary horizontal emission angle for each of the at least one light emission unit by relating the momentary flight direction to the respective unit-specific light emission direction in a horizontal plane and the control unit is further configured to select the red light, if the momentary horizontal emission angle is between 0° and 110°, to select the green light, if the momentary horizontal emission angle is between 0° and −110°, and to select the white light otherwise. In this way, the exterior aircraft navigation light is configured to emit light colors that are in accordance with the Federal Aviation Regulations (FAR), which require red color to be emitted by the aircraft towards the front left (i.e. within an angle of 0° and 110°), to emit green color towards the front right (i.e. within an angle of 0° and −110°), and to emit white light towards the rear of the aircraft (i.e. between −110° and +110°). The relating of the momentary flight direction to the respective unit-specific light emission direction may comprise the calculating of a difference between the momentary flight direction and the respective unit-specific light emission direction, potentially taking into account the horizontal opening angle of the light emission unit in question.

According to a further embodiment, the control unit is configured, when receiving a flight direction signal indicating a flight velocity of substantially zero, such as during a hover or after a landing, to select said one of the red light, the white light and the green light on the basis of the last received momentary flight direction before receiving the flight direction signal indicating a flight velocity of substantially zero. According to an alternative embodiment, the control unit is configured, when receiving a flight direction signal indicating a flight velocity of substantially zero, such as during a hover or after a landing, to select said one of the red light, the white light and the green light on the basis of assuming the momentary flight direction to be the nominal forward flight direction. The indication of the flight velocity being substantially zero is an indication of no actual momentary flight direction being present. In this case, the control unit may either indicate the last momentary flight direction or the nominal forward flight direction, as indicated in the two options given above, thus still conveying meaningful information.

According to a further embodiment, the multi-color light source of each of the at least one light emission unit is configured to emit the red light and the green light with a light intensity of at least 40 cd and the multi-color light source of each of the at least one light emission unit is configured to emit the white light with a light intensity of at least 20 cd. In this way, the multi-color light source is able to satisfy the minimum light intensity requirements, as set by the Federal Aviation Regulations (FAR), no matter which relation between the unit-specific light emission direction and the momentary flight direction exists at any given point in time.

According to a further embodiment, the multi-color light source of each of the at least one light emission unit comprises a first LED configured to emit red light, a second LED configured to emit white light, and a third LED configured to emit green light, with the control circuitry being configured to put one of the first LED, the second LED, and the third LED into an on state, such that the respective light emission unit emits said one of the red light, the white light and the green light. Providing individually controllable LEDs is a particularly convenient way of implementing the multi-color light source. The control circuitry may only be configured to provide three on/off signals per light emission unit to the individually controllable LEDs. Further, by making use of LED technology, the light emission unit(s) can have small space constraints, can be made highly energy efficient, and can have a long lifetime. The high space-efficiency is particularly useful, because it makes it easier to place the LEDs in close proximity to each other, enabling a single optical system to be provided for all of the LEDs and refracting the light from the LEDs in a substantially uniform manner. In a particular embodiment, the at least one red LED, the at least one white LED, and the at least one green LED may be arranged in a linear manner along the vertical extension of the light emission unit. In other words, all of the LEDs may be in the same horizontal position with respect to the nominal forward flight direction. In this way, identical or nearly identical horizontal light intensity distributions for the different colors may be achieved in a convenient manner. It is also possible to provide a plurality of red LEDs, a plurality of white LEDs and a plurality of green LEDs. The control circuitry may then be configured to put the plurality of red LEDs into the on state or to put the plurality of white LEDs into the on state or to put the plurality of green LEDs into the on state.

According to an alternative embodiment, the multi-color light source of each of the at least one light emission unit comprises a first LED configured to emit red light, a second LED configured to emit blue light, and a third LED configured to emit green light, with the control circuitry being configured to put one of the first LED and the third LED into an on state, such that the respective light emission unit emits one of the red light and the green light, and with the control circuitry being configured to put all of the first LED, the second LED, and the third LED into an on state, such that the respective light emission unit emits white light. In this way, the fact that the color mixing of light of the colors red, blue and green results in white light can be made use of. Again, the output of the colors red, white and green can be conveniently achieved via three LEDs only that can be individually controlled in a convenient manner. Again, it is also possible to provide a plurality of red LEDs, a plurality of blue LEDs and a plurality of green LEDs, with the control circuitry selecting the LEDs to be put in the on state accordingly.

According to a further embodiment, the first LED, the second LED, and the third LED, which may be a red LED, a green LED, and a white LED or a blue LED, are part of a multi-chip LED. In this way, the particularly space-efficient nature of multi-chip LEDs may be made use of, enhancing above described effects. Again, if a plurality of red, green, white or blue LEDs are used, the totality of all pluralities of LEDs may also be part of a multi-chip LED.

According to a further embodiment, the optical system of each of the at least one light emission unit is a single optical system, conditioning all of the red light, the white light, and the green light. In this way, only one optical system is provided for each light emission unit, keeping the part count low and making the production of the exterior aircraft navigation light efficient. According to a particular embodiment, the single optical system is a single optical lens with lateral shutters. In this way, the conditioning of the light intensity distribution may be provided by the optical lens, while the lateral shutters may provide for a limiting of the horizontal opening angle of the light emission unit in question, thus preventing an undesired overlap of light of different colors from adjacent light emission units.

According to a further embodiment, each of the at least one light emission unit has a horizontal light emission opening angle of between 5° and 15° around the unit-specific light emission direction. In other words, the light emission unit in question has an opening angle of between 5° and 15° around the unit-specific light emission direction in a horizontal plane. In a particular embodiment, the horizontal light emission opening angle may be defined as the angle where the light intensity is above a 40 cd for the red light and the green light and above 20 cd for the white light. The values of 40 cd and 20 cd may be referred to as the nominal light intensity values of the multi-color light source. According to a further embodiment, the horizontal light intensity distribution may fall down to 10% of the nominal light intensity value within a fading region of at most 5°. In this way, undesired overlap can be kept low. Above described horizontal light emission opening angle of between 5° and 15° has been found to be a good compromise between an acceptable number of light emission units and an acceptable resolution for the output of different colors in different horizontal directions.

According to a further embodiment, the exterior aircraft navigation light comprises between 3 and 20 light emission units, in particular between 4 and 15 light emission units. In a further particular embodiment, the exterior aircraft navigation light comprises between 9 and 12 light emission units.

Exemplary embodiments of the invention further include an exterior aircraft navigation lighting system, comprising a plurality of exterior aircraft navigation lights, with each of them being in accordance with any of the embodiments described above, wherein the plurality of exterior aircraft navigation lights comprises between 2 and 8 exterior aircraft navigation lights, in particular between 3 and 4 exterior aircraft navigation lights, and wherein a total number of the light emission units of the plurality of exterior aircraft navigation lights is at least 20, in particular at least 30. In a particular example, the total number of the light emission units is 36, with each of the light emission units having a horizontal opening angle of about 10°, thus covering the entire horizontal plane. With the exterior aircraft navigation lighting system having three or four exterior aircraft navigation lights, each of those exterior aircraft navigation lights may have 12 or 9 light emission units. Such a set-up has been found to be a good compromise between a manageable number of exterior aircraft navigation lights and a manageable number of light emission units within the respective exterior aircraft navigation lights. The additional features, modifications and technical effects, described above with respect to exemplary embodiments of the exterior aircraft navigation light, apply to the exterior aircraft navigation lighting system in an analogous manner.

According to a further embodiment, the unit-specific light emission directions of the light emission units are uniformly distributed in a horizontal plane. In this way, the exterior aircraft navigation lighting system allows for outputting the navigation lighting signals in the same manner in any output direction.

Exemplary embodiments of the invention further include an aircraft, such as a maned or unmarred helicopter, quadrocopter, or octocopter, having an exterior aircraft navigation lighting system, as described in any of the embodiments above. The additional features, modifications and technical effects, described above with respect to exemplary embodiments of the exterior aircraft navigation light and with respect to exemplary embodiments of the exterior aircraft navigation lighting system, apply to the aircraft in an analogous manner.

Exemplary embodiments of the invention further include a method of controlling an exterior aircraft navigation light of an aircraft having a nominal forward flight direction and being able to fly into the nominal forward flight direction as well as into a plurality of further flight directions, such as sideways or backwards, wherein the exterior aircraft navigation light has at least one light emission unit with a unit-specific light emission direction that has a predefined horizontal angle with respect to the nominal forward flight direction and wherein each of the at least one light emission unit comprises a multi-color light source configured to emit red light, white light and green light, the method comprising the steps of at least one of determining a momentary flight direction of the aircraft and receiving a flight direction signal indicative of the momentary flight direction of the aircraft, and, for each of the at least one light emission unit, relating the momentary flight direction of the aircraft to the unit-specific light emission direction in a horizontal plane, selecting one of the red light, the white light and the green light to be output by the light emission unit, and controlling the multicolor light source to emit said one of the red light, the white light and the green light. The additional features, modifications and technical effects, described above with respect to exemplary embodiments of the exterior aircraft navigation light and with respect to exemplary embodiments of the exterior aircraft navigation lighting system, apply to the method of controlling the exterior aircraft navigation light in an analogous manner. Accordingly, analogous method steps corresponding to above described features of the exterior aircraft navigation light are also disclosed herewith.

BRIEF DESCRIPTION OF DRAWINGS

Further exemplary embodiments of the invention are described below with reference to the enclosed figures, wherein.

DETAILED DESCRIPTION OF THE INVENTION

Figure 1:
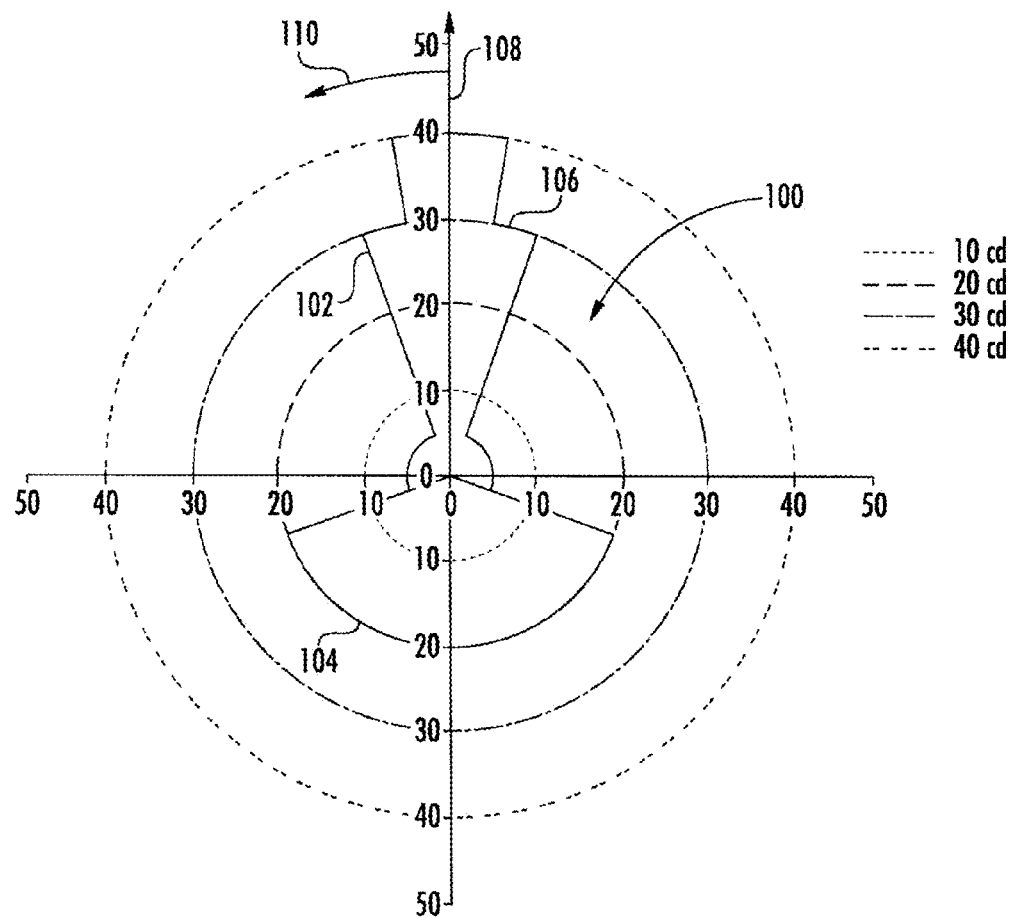
FIG. 1 shows the light intensities of the red, white and green light emission capacities of an aircraft navigation lighting system, as defined by the FAR.

FIG. 1 shows the minimum requirements of the light intensities of aircraft navigation lights, as defined by the Federal Aviation Regulations (FAR). The totality of the FAR requirements, i.e. the combination of the individual light intensity requirements discussed below, is referred to with reference numeral 100. The depicted Fig. shows the FAR requirements in a horizontal plane, which is a horizontal plane through the aircraft. Reference numeral 108 refers to a nominal forward flight direction of the aircraft. The light intensities of the light intensity distribution 100 are depicted as a function of an angle 110 with respect to the nominal forward flight direction 108.

The light intensity distribution 100 comprises a first partial light intensity distribution 102, a second partial light intensity distribution 104, and a third partial light intensity distribution 106. The first partial light intensity distribution 102 is a red light intensity distribution, the second partial light intensity distribution 104 is a white light intensity distribution, and the third partial light intensity distribution 106 is a green light intensity distribution.

The first partial light intensity distribution 102 has a value of 40 cd in an angular range from 0° to 10° with respect to the nominal forward flight direction 108, a value of 30 cd in an angular range between 10° and 20° with respect to the nominal forward flight direction 108, and a value of 5 cd in an angular range between 20° and 110° with respect to the nominal forward flight direction 108. The second partial light intensity distribution 106 has a value of 40 cd in an angular range from 0° to −10° with respect to the nominal forward flight direction 108, a value of 30 cd in an angular range between −10° and −20° with respect to the nominal forward flight direction 108, and a value of 5 cd in an angular range between −20° and −110° with respect to the nominal forward flight direction 108. The second partial light intensity distribution 104 has a value of 20 cd for the other angles of the horizontal plane i.e. for the angles between 110° and −110°. This angular range may also be referred to as the angular range from 110° to 250°. Analogously, the angular range of the third partial light intensity distribution 106 can be viewed as extending between 250° and 360°.

Figure 2A:
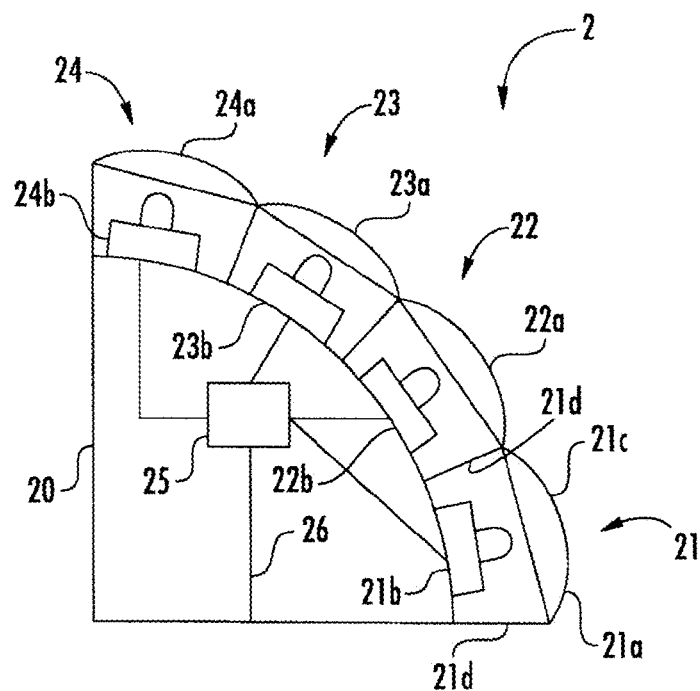
FIG. 2a-FIG. 2b shows two exemplary embodiments of exterior aircraft navigation lights in accordance with the invention in a schematic view.

FIG. 2a shows an exemplary embodiment of an exterior aircraft navigation light 2 in accordance with the invention. The exterior aircraft navigation light 2 is shown in a schematic manner, depicted in a top view. The exterior aircraft navigation light 2 may also be referred to as an exterior aircraft position light. The terms navigation light and position light are often used interchangeably in the art of exterior aircraft lighting.

The exterior aircraft navigation light 2 of FIG. 2a has a mounting structure 20 that forms the basis for the remaining components of the exterior aircraft navigation light 2. The mounting structure 20 has the form of a quarter of a disk, having two right-angled straight outer faces and one curved outer face, having the shape of a quarter of a circle.

The exemplary embodiment of the exterior aircraft navigation light 2 of FIG. 2a has 4 light emission units 21, 22, 23 and 24. It is pointed out that the number of 4 light emission units is exemplary in nature and that the exterior aircraft navigation light 2 may have a smaller or greater number of light emission units. The first light emission unit 21, the second light emission unit 22, the third light emission unit 23, and the fourth light emission unit 24 are arranged along the circular portion of the mounting structure 20. Each of the light emission units comprises a multi-color light source and an optical system. In particular, the first light emission unit 21 comprises a first optical system 21a and a first multi-color light source 21b, the second light emission unit 22 comprises a second optical system 22a and a second multi-color light source 22b, the third light emission unit 23 comprises a third optical system 23a and a third multi-color light source 23b, and the fourth light emission unit 24 comprises a fourth optical system 24a and a forth multi-color light source 24b. Each of the first to fourth optical systems 21a-24a comprises a lens arranged over the respective multi-color light source and a pair of shutters arranged besides the respective multi-color light source. The lens of the first light emission unit 21 is indicated with reference numeral 21c, and the shutters of the first light emission unit 21 are indicated with reference numerals 21d. No reference numerals are provided for the other lenses and shutters, in order to not overly crowd FIG. 2a. It is pointed out that some of the shutters simultaneously act as shutters for two adjacent light emission units.

All of the first multi-color light source 21b, the second multi-color light source 22b, the third multi-color light source 23b, and the fourth multi-color light source 24b have different light emission directions with respect to the mounting structure 20. In this way, each of the first light emission unit 21, the second light emission unit 22, the third light emission unit 23, and the fourth light emission unit 24 has a respective unit-specific light emission direction. As the exterior aircraft navigation light 2 is configured to be mounted in a particular position on an aircraft, all of the first light emission unit 21, the second light emission unit 22, the third light emission unit 23 and the fourth light emission unit 24 have unit-specific light emission directions with respect to the aircraft. In particular, they all have a respective predefined horizontal angle with respect to the nominal forward flight direction of the aircraft to which the exterior aircraft navigation light 2 is mounted.

The exterior aircraft navigation light 2 further comprises a control unit 25. The control unit 25 is coupled to all of the first multi-color light source 21b, the second multi-color light source 22b, the third multi-color light source 23b, and the fourth multi-color light source 24b via respective connection lines. The combination of the control unit 25 and the connection lines is also referred to as the control circuitry of the exterior aircraft navigation light 2. The control unit is configured to control each of these four multi-color light sources independently. Each of the first to fourth multi-color light sources 21b, 22b, 23b, and 24b is able to emit red light, to emit white light, and to emit green light. The control unit 25 is able to provide according control signals to each of the first to fourth multi-color light sources 21b-24b to control the color of the light output of each of the first to fourth multi-color light sources 21b-24b independently.

The control unit 25 is coupled to a signal input 26, which in turn is coupleable to a computational unit outside of the exterior aircraft navigation light 2, such as to an on-board aircraft navigation system. Via this connection to the outside environment, the exterior aircraft navigation light 2 is able to receive a flight direction signal that is indicative of a momentary flight direction of the aircraft during operation. Further, the control unit 25 has a memory where the unit-specific light emission directions of the first to fourth light emission units 21-24 are stored. On the basis of the momentary flight direction of the aircraft, as received via the flight direction signal trough the signal input 26, and on the basis of the unit-specific light emission directions, as stored in the memory of the control unit 25, the control unit 25 can control the first to fourth multi-color light sources 21b-24b with respect to the color to be output. This will be described in greater detail below with respect to FIG. 3.

Figure 2B:
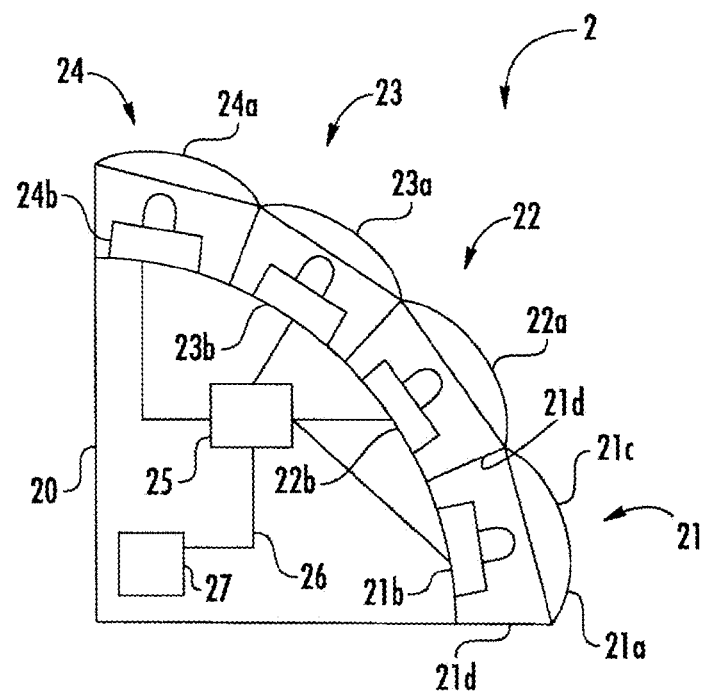

FIG. 2b shows a second exemplary embodiment of an exterior aircraft navigation light 2 in accordance with the invention. The exterior aircraft navigation light 2 of FIG. 2b is mostly identical with the exterior aircraft navigation light 2 of FIG. 2a, with a description of the identical features/components not being repeated for brevity. The exterior aircraft navigation light 2 of FIG. 2b has a flight direction sensor 27 as an additional element. The flight direction sensor 27 is a device that is capable of determining the momentary flight direction of the aircraft. The flight direction sensor 27 is coupled to the control unit 27 via signal input 26. In this way, the control unit 25 obtains information about the momentary flight direction of the aircraft from a module within the exterior aircraft navigation light 2. The signal input 26 is not coupled to an outside of the exterior aircraft navigation light 2, but to the flight direction sensor 27.

Figure 3A:
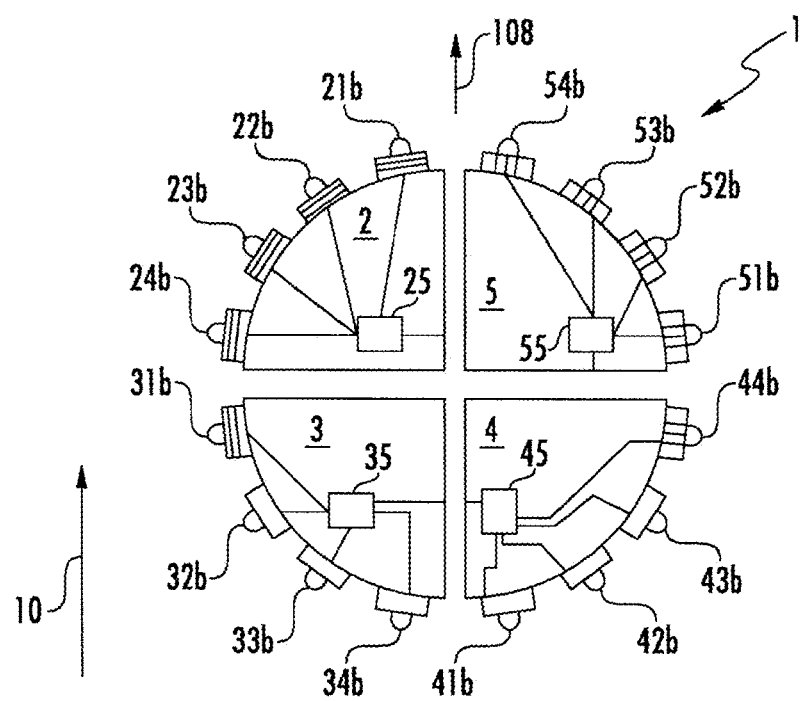
FIG. 3a-FIG. 3b shows an exemplary embodiment of an exterior aircraft navigation lighting system in accordance with the invention in a schematic view, depicted in two different operating states.

FIG. 3a shows an exterior aircraft navigation lighting system 1 in accordance with an exemplary embodiment of the invention. The exterior aircraft navigation lighting system 1 is shown in a schematic manner in a first operating state, as will be explained below.

The exterior aircraft navigation lighting system 1 comprises 4 exterior aircraft navigation lights 2, 3, 4, and 5. Each of these 4 exterior aircraft navigation lights 2, 3, 4, and 5 has a configuration that substantially corresponds to the exterior aircraft navigation light 2, as shown and described with respect to FIG. 2a. For ease of illustration, the optical systems of the respective light emission units of the respective exterior aircraft navigation lights 2, 3, 4, and 5 are not shown in FIG. 3a.

The first exterior aircraft navigation light 2 comprises a first multi-color light source 21b, a second multi-color light source 22b, a third multi-color light source 23b, and a fourth multi-color light source 24b, all coupled to the control unit 25 of the first exterior navigation light 2. The second exterior aircraft navigation light 3 comprises a first multi-color light source 31b, a second multi-color source 32b, a third multi-color light source 33b and a fourth multi-color light source 34b, all coupled to the control unit 35 of the second exterior aircraft navigation light 3. The third exterior aircraft navigation light 4 comprises a first multi-color light source 41b, a second multi-color light source 42b, a third multi-color light source 43b, and a fourth multi-color light source 44b, all coupled to the control unit 45 of the third exterior aircraft navigation light. The fourth exterior aircraft navigation light 5 comprises a first multi-color light source 51b, a second multi-color light source 52b, a third multi-color light source 53b, and a fourth multi-color light source 54b, all coupled to the control unit of the fourth exterior aircraft navigation light 5.

For ease of illustration, the first to fourth exterior light sources 2, 3, 4, and 5 are depicted in close proximity to each other. When installed in an aircraft, the first to fourth exterior aircraft navigation lights 2, 3, 4, and 5 are generally arranged in positions of the aircraft that are spaced apart from each other. In particular, the positions of the first to fourth exterior aircraft navigation lights 2, 3, 4, and 5 may be chosen in such a way that they allow for unimpeded light emission towards the environment. Such position may be chosen to be as removed as possible from the center of the aircraft, in order that no aircraft structure obstructs the light emission.

When installed in an aircraft, the first to fourth exterior aircraft navigation lights have the shown positions with respect to a nominal forward flight direction indicated by arrow 108. With the drawing plane of FIG. 3a being a horizontal plane in the aircraft frame of reference, each of the multi-color light sources, which is part of a respective light emission unit, has a predefined horizontal angle with respect to the nominal forward flight direction 108. In the particular example of FIG. 3a, the first to fourth multi-color light sources 21b, 22b, 23b and 24b of the first exterior aircraft navigation light 2 have predefined horizontal angles with respect to the nominal forward flight direction 108 of 11.25°, 33.75°, 56.25°, and 78.75°, respectively. The first to fourth multi-color light sources 31b, 32b, 33b, and 34b of the second exterior aircraft navigation light 3 have predefined horizontal angles with respect to the nominal forward flight direction 108 of 101.25°, 123.75°, 146.25°, and 168.75°, respectively. The first to fourth multi-color light sources 41b, 42b, 43b and 44b of the third exterior aircraft navigation light 4 have predefined horizontal angles with respect to the nominal forward flight direction 108 of −168.75°, −146.25°, −123.75°, and −101.25°, respectively. The first to fourth multi-color light sources 51b, 52b, 53b, and 54b of the fourth exterior aircraft navigation light 5 have predefined horizontal angles with respect to the nominal forward flight direction 108 of −78.75°, −56.25°, −33.75°, and −11.25°, respectively.

In this way, the multi-color light sources are uniformly distributed around the horizontal plane, allowing for light emission in all directions. In the example of FIG. 3a, each of the light emission units, with each of the light emission units comprising exactly one of the multi-color light sources, has an opening angle of 22.5° around the respective unit-specific light emission direction, discussed above with respect to the predefined horizontal angle. In this way, light emission into 360° of the horizontal plane is made possible.

The first operating state of the exterior aircraft navigation lighting system 1 of FIG. 3a will now be described. A momentary flight direction of the aircraft, to which the exterior aircraft navigation lighting system 1 is mounted, is depicted by an arrow 10. In the exemplary operating state of FIG. 3a, the momentary flight direction 10 corresponds to the nominal forward flight direction 108. More exactly, a horizontal component of the momentary flight direction corresponds to the nominal forward flight direction 108. However, as horizontal light intensity distributions are looked at, the terms momentary flight direction and horizontal component of the momentary flight direction are used interchangeably herein.

As is apparent from FIG. 3a and from above discussion, each of the multi-color light sources of the exterior aircraft navigation lighting system 1 of FIG. 3a has a different horizontal angle with respect to the momentary flight direction 10. All of the control units 25, 35, 45, and 55 receive a flight direction signal from outside of the exterior aircraft navigation lighting system 1, such as from an on-board navigation system (not shown), and calculate a momentary horizontal emission angle for each of the light emission units. The momentary horizontal emission angle is defined as the difference between the unit-specific light emission direction, which is in turn defined by the predefined horizontal angle with respect to the nominal forward flight direction 108, and the momentary flight direction 10. For calculating the momentary horizontal emission angle, each of the control units 25, 35, 45 and 55 relates the momentary flight direction 10 to the unit-specific light emission directions of the respective light emission units of the exterior aircraft navigation light in question, as stored in the memory of the respective control unit. In the operating example of FIG. 3a, the control units calculate the momentary horizontal emission angles to be the same as the predefined horizontal angles with respect to the nominal forward flight direction 108, as listed above.

If the momentary horizontal emission angle is between 0° and 110°, the control unit controls the respective multi-color light source to emit red light. In the exemplary operating state of FIG. 3a, the control unit 25 of the first exterior aircraft navigation light 2 controls the first multi-color light source 21b, the second multi-color light source 22b, the third multi-color light source 23b, and the fourth multi-color light source 24b to emit red light. Analogously, the control unit 35 of the second exterior aircraft navigation light 3 controls the thirst multi-color light source 31a to emit red light. The emission of red light is indicated via a hatching of the respective multi-color light sources substantially parallel to the circular contour of the respective exterior aircraft navigation light.

If the control unit calculates the momentary horizontal emission angle to be between 0° and −110°, the control unit controls the respective multi-color light source to emit green light. In the exemplary operating state of FIG. 3a, the control unit 55 of the fourth exterior aircraft navigation light 5 controls the first multi-color light source 51b, the second multi-color source 52b, the third multi-color light source 53b, and the fourth multi-color light source 54b to emit green light. Analogously, the control unit 45 of the third exterior aircraft navigation light 4 controls the fourth multi-color light source 44b to emit green light. The emission of green light is indicated via a hatching of the respective multi-color light sources substantially orthogonal to the circular contour of the respective exterior aircraft navigation light.

If the momentary horizontal emission angle is between 110° and 180° or between −110° and −180°, the control unit controls the respective multi-color light source to emit white light. In the exemplary operating state of FIG. 3a, the control unit 35 of the second exterior aircraft navigation light 3 controls the second multi-color light source 32b, the third multi-color light source 33b, and the fourth multi-color light source 34b to emit white light. Analogously, the control unit 45 of the third exterior aircraft navigation light 4 controls the first multi-color light source 41b, the second multi-color light source 42b, and the third multi-color light source 43b to emit white light. The emission of white light is indicated in FIG. 3a by the absence of any hatching of the multi-color light sources.

Figure 3B:
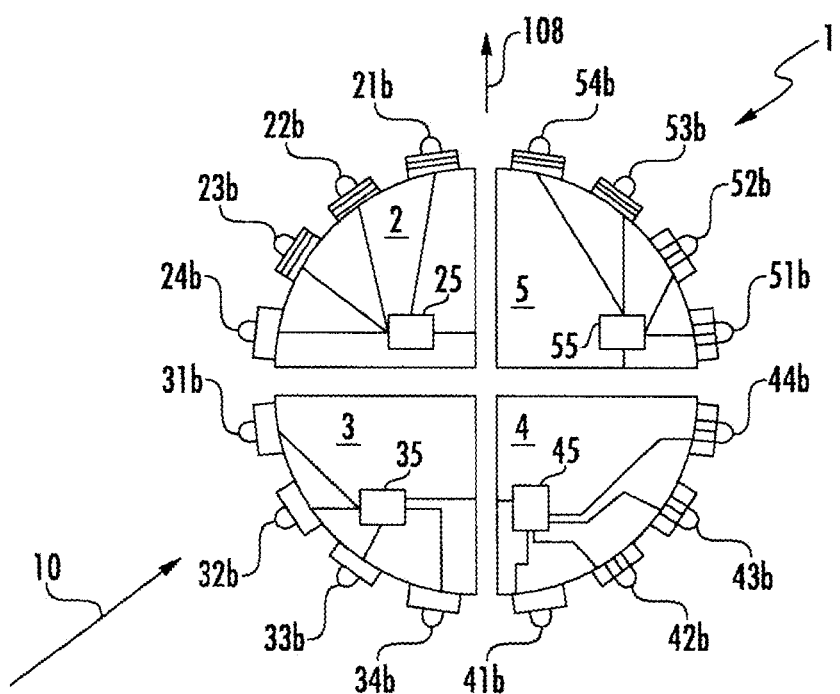

With respect to FIG. 3b, a second operating state of the exterior aircraft navigation lighting system 1 of FIG. 3a is depicted and described. The components of the exterior aircraft navigation lighting system 1 of FIG. 3b are the same as the components of the exterior aircraft navigation lighting system of FIG. 3a. A description thereof will therefore be omitted for brevity.

In the second operating state, as depicted in FIG. 3b, the aircraft has a momentary flight direction 10 that is angled with respect to the nominal flight direction 108. In particular, the momentary flight direction 10 has an angle of −45° with respect to the nominal forward flight direction 108. On the basis of this altered momentary flight direction 10, the individual light emission units, and thus the individual multi-color light sources, have an altered momentary horizontal emission angle. In particular, in the exemplary operating state of FIG. 3b, the first to fourth multi-color light sources 21b, 22b, 23b and 24b of the first exterior aircraft navigation light 2 have momentary horizontal emission angles of 56.25°, 78.75°, 101.25°, and 123.75°, respectively. The first to fourth multi-color light sources 31b, 32b, 33b, and 34b of the second exterior aircraft navigation light 3 have momentary horizontal emission angles of 146.25°, 168.75°, −168.75°, and −146.25°, respectively. The first to fourth multi-color light sources 41b, 42b, 43b and 44b of the third exterior aircraft navigation light 4 have momentary horizontal emission angles of −123.75°, −101.25°, −78.75°, and −56.25°, respectively. The first to fourth multi-color light sources 51b, 52b, 53b, and 54b of the fourth exterior aircraft navigation light 5 have momentary horizontal emission angles of −33.75°, −11.25°, 11.25°, and 33.75°, respectively.

On the basis of above described control algorithm for controlling the individual multi-color light sources, the control units 25, 35, 45, and 55 take the following control actions. In the depicted exemplary operating state, the control unit 25 of the first exterior aircraft navigation light 2 controls the first multi-color light source 21b, the second multi-color light source 22b, and the third multi-color light source 23b to emit red light, and controls the fourth multi-color light source 24b to emit white light. The control unit 35 of the second exterior aircraft navigation light 3 controls the first multi-color light source 31b, the second multi-color light source 32b, the third multi-color light source 33b, and the fourth multi-color light source 34b to emit white light. The control unit 45 of the third exterior aircraft navigation light 4 controls the first multi-color light source 41b to emit white light, and controls the second multi-color light source 42b, the third multi-color light source 43b, and the fourth multi-color light source 44b to emit green light. The control unit 55 of the fourth exterior aircraft navigation light 2 controls the first multi-color light source 51b and the second multi-color light source 52b to emit green light, and controls the third multi-color light source 53b and the fourth multi-color light source 54b to emit red light. In this way, the exterior aircraft navigation lighting system 1 outputs red, white and green light that correctly indicates the momentary flight direction of the aircraft.

It is pointed out that the number of exterior aircraft navigation lights and the number of light emission units within the exterior aircraft navigation lights, as shown in described with respect to FIG. 3, are exemplary. Both the number of exterior aircraft navigation lights and the number of light emission units within those exterior aircraft navigation lights can vary. For example, it has been found to be a good compromise between accuracy/resolution and complexity to provide 4 exterior aircraft navigation lights, with each of these exterior aircraft navigation lights having 9 light emission units. This provides for a total of 36 light emission units and thus for a total of 36 multi-color light sources.

Figure 4A:
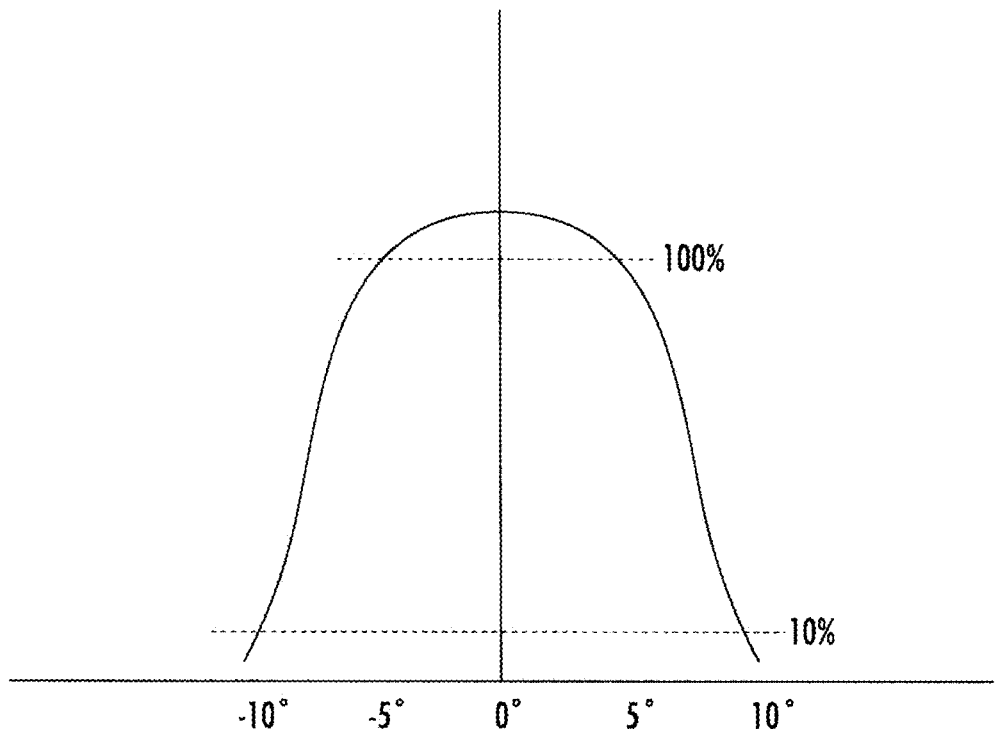
FIG. 4a-FIG. 4b shows exemplary horizontal and vertical light intensity distributions of exemplary light emission units to be used in exemplary embodiments of exterior aircraft navigation lights in accordance with the invention.

For such a case of 36 light emission units, exemplary light emission distributions are shown in FIG. 4. In particular, FIG. 4 shows a horizontal light intensity distribution of such an exemplary light emission unit. Within an angular range of between −5° and 5° around the unit-specific light emission direction, the light intensity is at or above a nominal light intensity value, which is referred to as a 100% value in the illustration of FIG. 4a. This nominal light intensity value may be 40 cd for the green light as well as for the red light. Further, this nominal light intensity value may be 20 cd for the white light. By providing this nominal light intensity value over an angular range of 10° and by providing 36 light emission units in total, this nominal light intensity value can be achieved in each output direction in the horizontal plane. The depicted light intensity distribution has the further feature of a rapid decline of the light intensity in angular ranges beyond −5° and beyond +5°. In particular, the light intensity drops to 10% of the nominal light intensity value at +10° and at −10°. In this way, the overlap between the light outputs of different light emission units can be kept small. It is ensured that the light from one light emission unit that strays into the intended opening angle of an adjacent light emission unit and that may have a "wrong" color is kept to a low intensity.

Figure 4B:
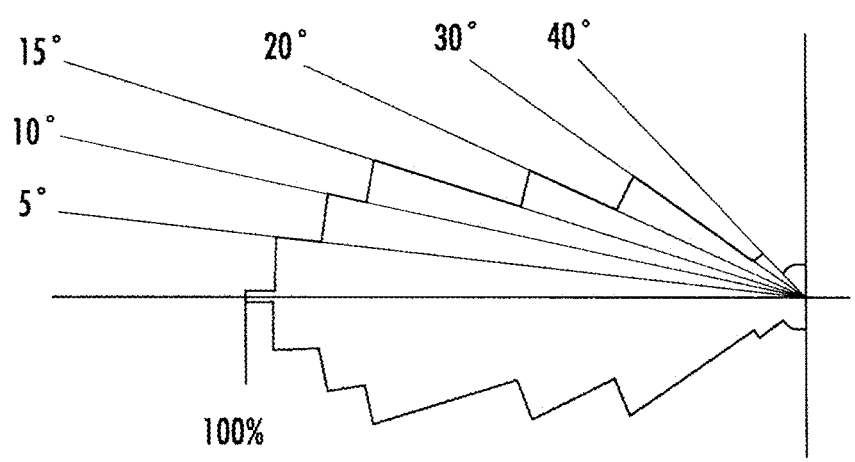

FIG. 4b shows an exemplary vertical light intensity distribution that may be provided by each of the light emission units. In particular, the light intensity distribution of FIG. 4b may represent minimum light intensity requirements, while the actual light intensity distribution of the light emission units may be an envelope curve around these requirements. The requirements are given with respect to a nominal light intensity value, also referred to as a 100% value. According to the depicted requirements, the nominal light intensity value may be present in an angular range between −1° and 1°. A light intensity of 90% of the nominal light intensity value may be present between +/−1° and +/−5°. A light intensity of 80% of the nominal light intensity value may be present between +/−5° and +/−10°. A light intensity of 70% of the nominal light intensity value may be present between +/−10° and +/−15°. A light intensity of 50% of the nominal light intensity value may be present between +/−15° and +/−20°. A light intensity of 30% of the nominal light intensity value may be present between +/−20° and +/−30°. A light intensity of 10% of the nominal light intensity value may be present between +/−30° and +/−40°. A light intensity of 5% of the nominal light intensity value may be present between +/−40° and +/−90°.

FIG. 5 shows two exemplary embodiments of the multi-color light sources, as discussed above. As an example, the first multi-color light source 21b of the first exterior aircraft navigation light 2 of FIGS. 2 and 3 is depicted in FIG. 5. It is apparent that all of the other multi-color light sources depicted in FIG. 3 may be embodied in accordance with any of the embodiments shown in FIG. 5.

Figure 5A:
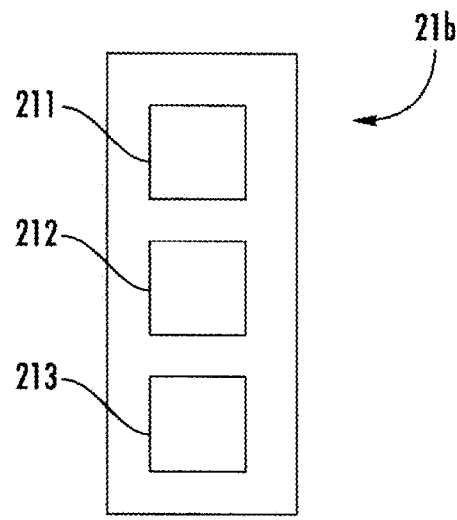
FIG. 5a-FIG. 5b shows two exemplary embodiments of multi-color light sources to be used in exemplary embodiments of exterior aircraft navigation lights in accordance with the invention.

The multi-color light source 21b of FIG. 5a comprises a first LED 211, which emits red-colored light, when switched on, a second LED 212, which emits white-colored light, when switched on, and a third LED 213, which emits green-colored light, when switched on. In this way, the control unit may select one of the first, second and third LEDs 211, 212 and 213 for being switched on and for emitting the desired color.

Figure 5B:
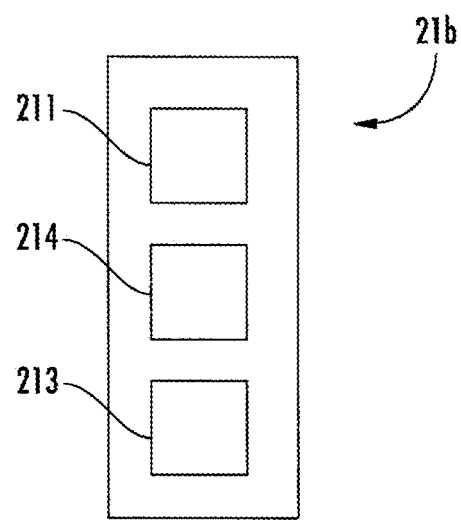

FIG. 5b shows a second exemplary embodiment for the multi-color light source 21b. The multi-color light source 21b of FIG. 5b also has the first LED 211, which emits red lights, and the third LED 213, which emits green light. However, instead of having an LED that emits white light, the multi-color light source 21b of FIG. 5b comprises a second LED 214, which emits blue-colored light, when switched on. When the control unit controls the multi-color light source 21b to emit red or green light, the first LED 211 or the third LED 213 is switched on, respectively. When the control unit controls the multi-color light source 21b to emit white light, it controls all of the first LED 211, the second LED 214 and the third LED 213 to be switched on, with the red, green and blue light mixing to provide a white light output.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:
1. An exterior aircraft navigation light for an aircraft having a nominal forward flight direction and being able to fly into the nominal forward flight direction as well as into a plurality of further flight directions, such as sideways or backwards,
wherein the exterior aircraft navigation light has at least one light emission unit and control circuitry coupled to the at least one light emission unit, wherein the exterior aircraft navigation light is configured such that each of the at least one light emission unit has a unit-specific light emission direction that has a predefined horizontal angle with respect to the nominal forward flight direction, wherein each of the at least one light emission unit comprises:
  a multi-color light source configured to emit red light, white light and green light, and
  an optical system for conditioning the red light, the white light and the green light emitted by the multi-color light source, wherein the control circuitry is configured, as a response to a momentary flight direction of the aircraft and the unit-specific light emission direction, to control the multi-color light source such that the respective light emission unit emits one of the red light, the white light and the green light; and wherein the control circuitry has a control unit comprising a signal input for receiving a flight direction signal indicative of the momentary flight direction, wherein the control unit is configured, as a response to the flight direction signal and the unit-specific light emission direction, to select said one of the red light, the white light and the green light and to control the multi-color light source accordingly for each of the at least one light emission unit;

wherein the control unit is configured to determine a momentary horizontal emission angle for each of the at least one light emission unit by relating the momentary flight direction to the respective unit-specific light emission direction in a horizontal plane;

wherein the control unit is configured to select the red light, if the momentary horizontal emission angle is between 0° and 110°, to select the green light, if the momentary horizontal emission angle is between 0° and −110°, and to select the white light otherwise; and wherein each of the at least one light emission unit has a horizontal light emission opening angle of between 5° and 15° around the unit-specific light emission direction.

2. An exterior aircraft navigation light according to claim 1, wherein the signal input of the control unit is connectable to an external signal line for receiving the flight direction signal from an on-board aircraft navigation system that is external to the exterior aircraft navigation light.

3. An exterior aircraft navigation light according to claim 1, further comprising a flight direction sensor configured to detect the momentary flight direction and to output the flight direction signal indicative of the momentary flight direction, wherein the control unit is coupled to the flight direction sensor via the signal input for receiving the flight direction signal.

4. An exterior aircraft navigation light according to claim 1, wherein the multi-color light source of each of the at least one light emission unit is configured to emit the red light and the green light with a light intensity of at least 40 cd and wherein the multi-color light source of each of the at least one light emission unit is configured to emit the white light with a light intensity of at least 20 cd.

5. An exterior aircraft navigation light according to claim 1, wherein the multi-color light source of each of the at least one light emission unit comprises a first LED configured to emit red light, a second LED configured to emit white light, and a third LED configured to emit green light, with the control circuitry being configured to put one of the first LED, the second LED, and the third LED into an on state, such that the respective light emission unit emits said one of the red light, the white light and the green light.

6. An exterior aircraft navigation light according to claim 1, wherein the multi-color light source of each of the at least one light emission unit comprises a first LED configured to emit red light, a second LED configured to emit blue light, and a third LED configured to emit green light, with the control circuitry being configured to put one of the first LED and the third LED into an on state, such that the respective light emission unit emits one of the red light and the green light, and with the control circuitry being configured to put all of the first LED, the second LED, and the third LED into an on state, such that the respective light emission unit emits white light.

7. An exterior aircraft navigation light according to claim 5, wherein the first LED, the second LED, and the third LED are part of a multi-chip LED.

8. An exterior aircraft navigation light according to claim 1, wherein the optical system of each of the at least one light emission unit is a single optical system, in particular a single optical lens with lateral shutters, conditioning all of the red light, the white light, and the green light.

9. An exterior aircraft navigation lighting system comprising:
  a plurality of exterior aircraft navigation lights, each in accordance with claim 1, wherein the plurality of exterior aircraft navigation lights comprises between 2 and 8 exterior aircraft navigation lights, and wherein a total number of the light emission units of the plurality of exterior aircraft navigation lights is at least 20.

10. The exterior aircraft navigation lighting system according to claim 9, wherein the plurality of exterior aircraft navigation lights comprises between 3 and 4 exterior aircraft navigation lights and a total number of the light emission units of the plurality of exterior aircraft navigation lights is at least 30.

11. The exterior aircraft navigation lighting system according to claim 9, wherein the unit-specific light emission directions of the light emission units are uniformly distributed in a horizontal plane.

12. An aircraft having an exterior aircraft navigation lighting system according to claim 9.

13. A method of controlling an exterior aircraft navigation light of an aircraft having a nominal forward flight direction and being able to fly into the nominal forward flight direction as well as into a plurality of further flight directions, such as sideways or backwards, wherein the exterior aircraft navigation light has at least one light emission unit with a unit-specific light emission direction that has a predefined horizontal angle with respect to the nominal forward flight direction, wherein each of the at least one light emission unit has a horizontal light emission opening angle of between 5° and 15° around the unit-specific light emission direction and wherein each of the at least one light emission unit comprises a multi-color light source configured to emit red light, white light and green light, the method comprising the steps of:
  at least one of determining a momentary flight direction of the aircraft and receiving a flight direction signal indicative of the momentary flight direction of the aircraft, and
  for each of the at least one light emission unit:
    determining a momentary horizontal emission angle by relating the momentary flight direction of the aircraft to the unit-specific light emission direction in a horizontal plane, selecting one of the red light, the white light and the green light to be output by the light emission unit, wherein the red light is selected, if the momentary horizontal emission angle is between 0° and 110°, wherein the green light is selected, if the momentary horizontal emission angle is between 0° and −110°, and wherein the white light is selected otherwise, and controlling the multi-color light source to emit said one of the red light, the white light and the green light.

* * * * *